(12) United States Patent
Cho

(10) Patent No.: US 6,262,859 B1
(45) Date of Patent: Jul. 17, 2001

(54) METHOD AND APPARATUS FOR PROVIDING SERVO INFORMATION ON A DISK IN A HARD DRIVE ASSEMBLY

(75) Inventor: Keung Young Cho, San Jose, CA (US)

(73) Assignee: Samsung Electronics Company, San Jose, CA (US)

(*) Notice: Subject to any disclaimer, the term of this patent is extended or adjusted under 35 U.S.C. 154(b) by 0 days.

(21) Appl. No.: 09/132,198

(22) Filed: Aug. 11, 1998

(51) Int. Cl.[7] .................................................. G11B 5/596
(52) U.S. Cl. .................................. 360/77.08; 360/48
(58) Field of Search .................................... 360/75, 77.08, 360/77.07, 77.05, 77.02, 48, 66

(56) References Cited

U.S. PATENT DOCUMENTS 4,539,662 * 9/1985 Hatano et al. ............................ 369/13
5,917,670 * 6/1999 Scaramuzzo et al. .................. 360/53
5,946,157 * 8/1999 Codilian et al. ........................ 360/75

* cited by examiner

Primary Examiner—David Hudspeth
Assistant Examiner—Dan I. Davidson
(74) Attorney, Agent, or Firm—Irell & Manella, LLP

(57) ABSTRACT

The present invention is a method and apparatus for providing servo information on a disk in a hard disk drive. The hard disk drive has a disk with a plurality of tracks. Each of the plurality of tracks having at least one servo sector having a first half track portion and a second half track portion. A first location of the first half track portion of the at least one servo sector is erased using a first predetermined field. A second location of the first half track portion that is adjacent to the first half track portion of the at least one servo sector is erased using a second predetermined field. Various embodiments are disclosed.

40 Claims, 19 Drawing Sheets

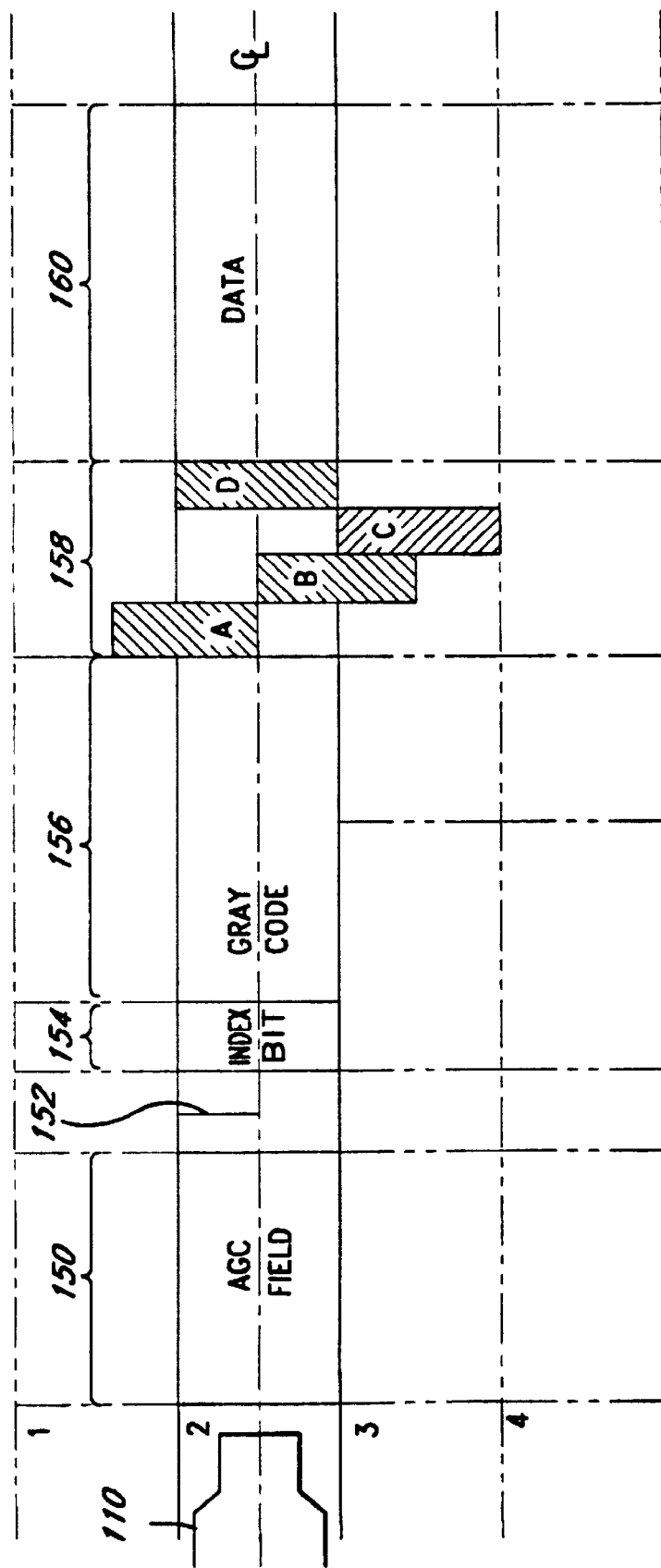

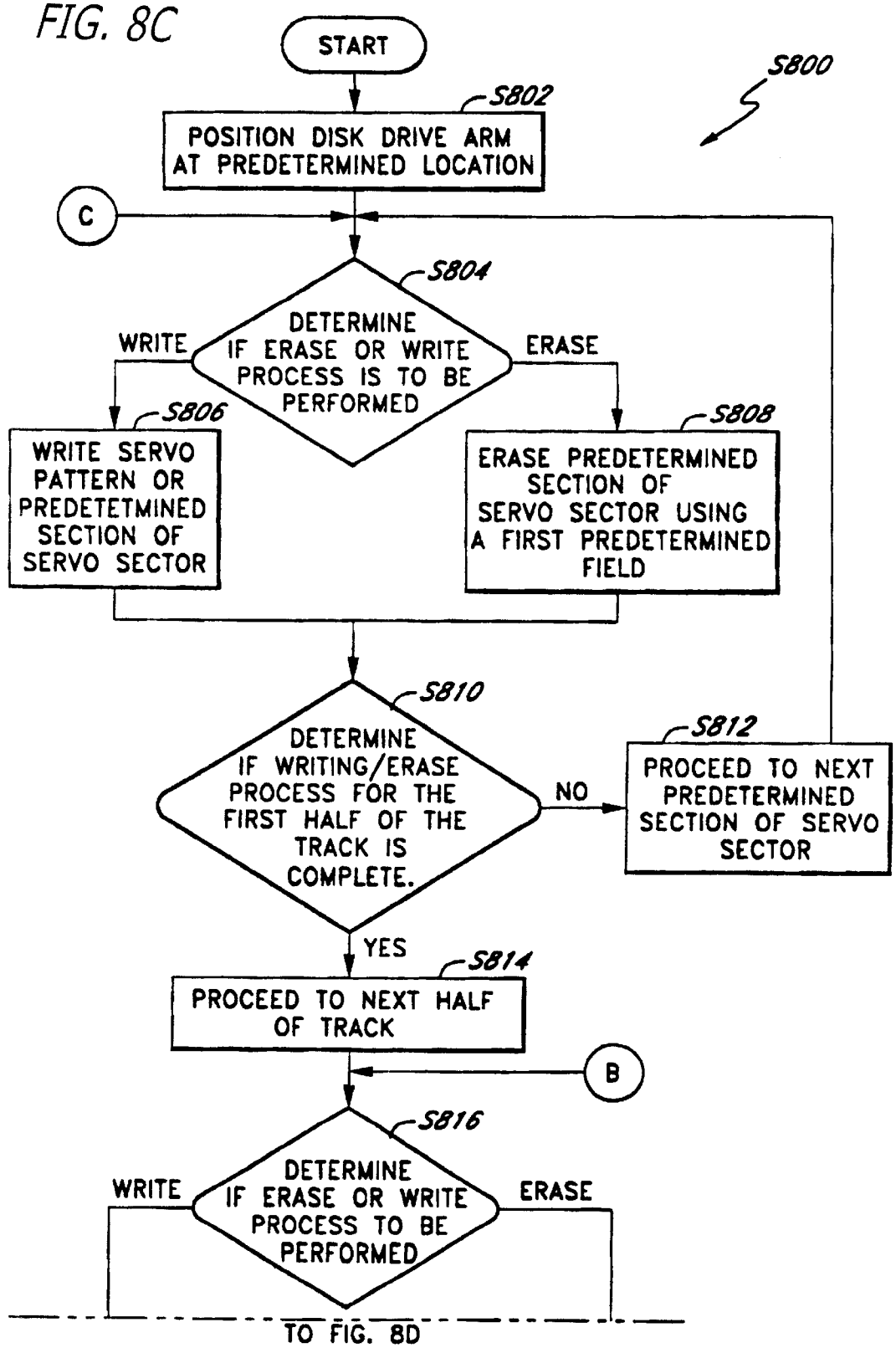

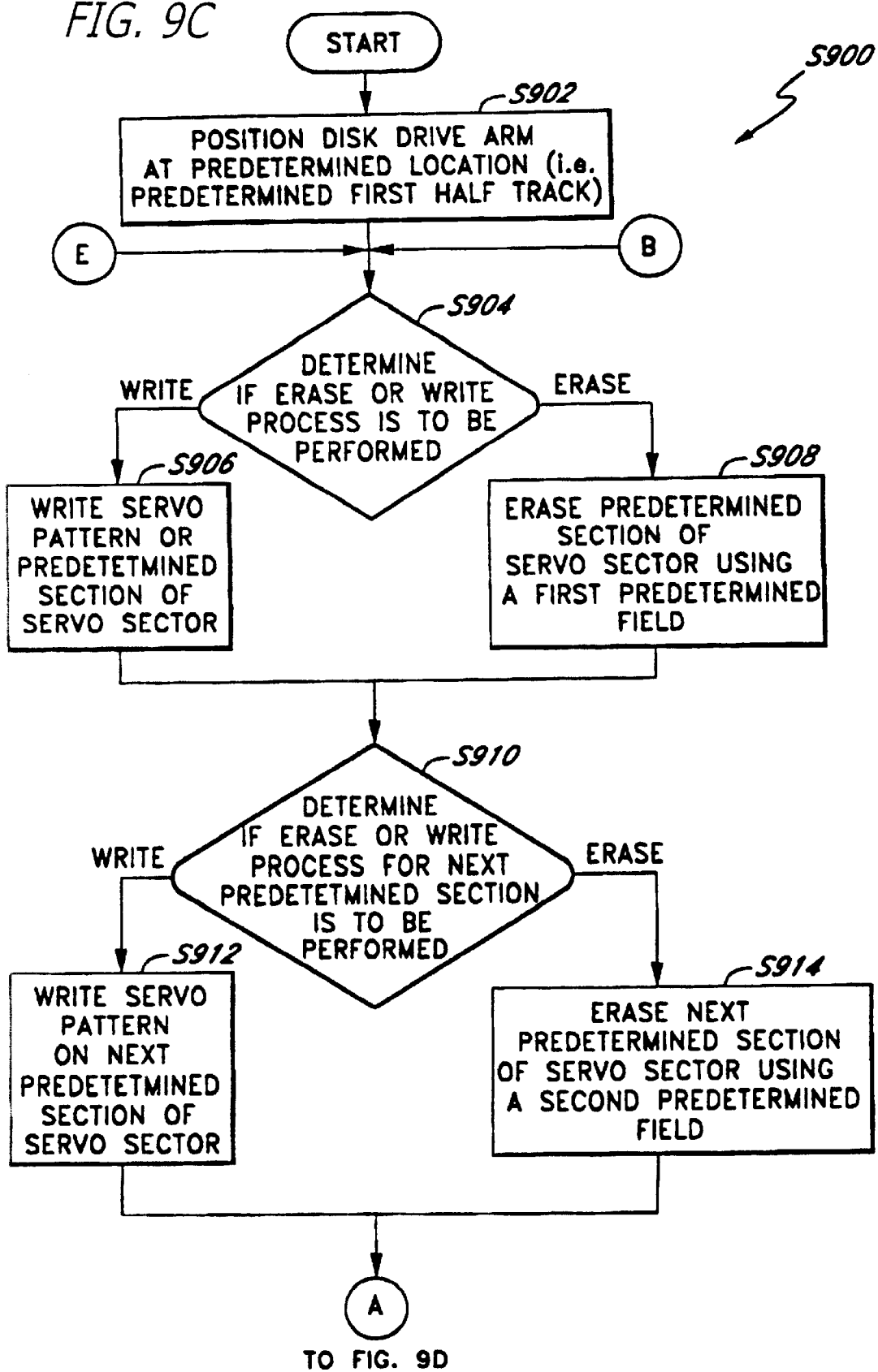

METHOD AND APPARATUS FOR PROVIDING SERVO INFORMATION ON A DISK IN A HARD DRIVE ASSEMBLY

BACKGROUND OF THE INVENTION

1. Field of the Invention

The present invention relates in general to disk storage systems and more particularly, to a method and apparatus for providing servo information on a disk in a hard drive assembly.

2. Description of the Related Art

Disk drives are magnetic recording devices used for the storage of information. The information is typically recorded on concentric tracks on either surface of one or more magnetic recording disks. To facilitate the storage and retrieval of data in an orderly manner, disks are typically organized in blocks called sectors. These sectors are located on the disk by a set of unique specifiers called cylinder (or track), head (or side) and sector number. The disks are rotatably mounted to a spin motor and information is accessed by means of read/write heads that are mounted to actuator arms which are rotated by a voice coil motor. The voice coil motor is excited with a current to rotate the actuator and move the heads.

The movement of the actuator is controlled by a servo system, utilizing servo information recorded on one or more of the magnetic recording disks. By reading this servo information, the actual radial positions of the heads can be determined, and after comparison with the desired head radial positions, control signals can be sent to move the actuator accordingly. Servo information is typically stored on a disk in one of two ways. In the first, a dedicated servo system, a set of several tracks on the disk or the entire disk surface, is reserved exclusively for storing information associated with the characteristic of the particular drive. Such information includes servo parameters and read/write channel parameters. A servo head reads this information to provide a continuous signal indicating the position of the servo head with respect to the servo disk. In the second type of servo system, the embedded servo system, sectors of servo information are interspersed with sectors of data on each disk surface. As a read head follows the data track around, it regularly reads a fresh sample of servo information from each servo sector with which to control its position.

In the latter case, the servo information is typically written as a plurality of servo bits A, B, C, D in a servo field of each track, as shown in FIG. 1. To duplicate the servo pattern of FIG. 1, the head must first be positioned over a first half of a designated track, and then be directed to write and erase the predetermined sections of the servo field under the direction of a servo controller, to produce the servo pattern as shown in FIG. 1. Upon writing and erasing of the first half of the designated track, the head is microjogged to a position over a second half of the designated track. It is then directed to write and erase the predetermined sections of the servo field.

To write or erase information, a current is provided within the R/W head, which changes the resistance of the R/W head when it is exposed to a magnetic field. Presently, a current of a particular polarity (e.g., positive or negative) is used during the entire erase process, so that the resulting sections of the servo field are erased in only one direction, as shown in FIGS. 2A and 2B. The direct current (D.C.) erasing band resulting from such erasure of each section of the servo field creates a D.C. coupling on the pole of the head during the read operation. This results in a base line shift of the servo signal, and subsequently results in reproducing a servo pattern that appears as shown in FIG. 3. The effects of the D.C. coupling are minor when the track density of a disk is low. However, as track density increases, the D.C. base line shift will result in producing an unstable and unreliable servo signal.

Accordingly, there is a need in the technology for a method and apparatus for providing servo information on a disk which minimizes and/or eliminates the D.C. base line shift during the read operation.

BRIEF SUMMARY OF THE INVENTION

The present invention is a method and apparatus for providing servo information on a disk in a hard disk drive. The hard disk drive has a disk with a plurality of tracks. Each of the plurality of tracks having at least one servo sector having a first half track portion and a second half track portion. A first location of the first half track portion of the at least one servo sector is erased using a first predetermined field. A second location of the first half track portion that is adjacent to the first half track portion of the at least one servo sector is erased using a second predetermined field. Various embodiments are disclosed.

BRIEF DESCRIPTION OF THE DRAWINGS

FIG. 7 illustrates the layout of a typical sector.

FIGS. 8C and 8D is a flowchart illustrating one embodiment of the process(es) of writing servo information as shown in FIGS. 8A and/or 8B.

FIGS. 9C, 9D and 9E is a flowchart illustrating one embodiment of the process(es) of writing servo information as shown in FIGS. 9A and/or 9B.

DETAILED DESCRIPTION OF THE INVENTION

The present invention provides an apparatus and method for providing servo information. In one embodiment, servo information is written one burst at a time on each half track portion of each track. To provide the servo bursts, erasure of various portions of the half track is necessary. In one embodiment, the erase process for a first half of a track is conducted using a current of a first predetermined field or polarity. The erase process for the second half of the same track (i.e., the adjacent half track) is then conducted using a current of a second predetermined field or an opposite polarity. In an alternative embodiment, erasure of adjacent portions (corresponding to each servo burst locations where such erasure is required) is conducted using a current of opposite polarities. For example, a first burst portion is erased using a current of a first predetermined field. Then, an adjacent servo burst portion is erased using a current of a second predetermined filed that is opposite in polarity to the first predetermined field. The adjacent servo burst portion may be as the same track (or half track) or on an adjacent track (or half track).

Figure 4A:
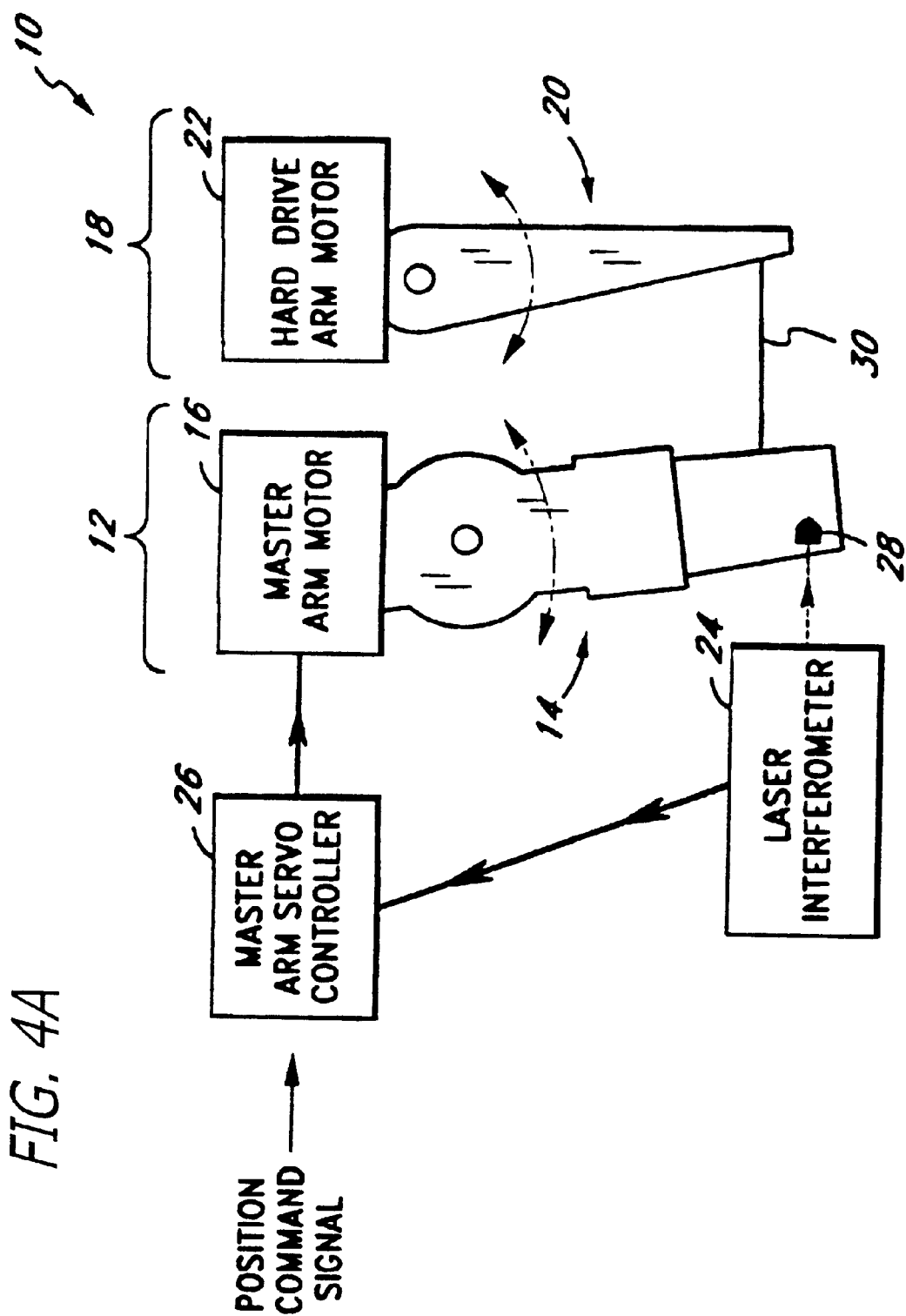
FIG. 4A illustrates a servo writing/erasure system which implements the method of the present invention.

Referring to the drawings more particularly by reference numbers, FIG. 4A illustrates a servo writing/erasure system 10 which implements the servo writing/erasure process of the present invention. The servo writing/erasure system 10 directs the re-servo writing/erasure process by positioning the read/write heads in a magnetic disk drive from a master arm and motor. The servo writing/erasure system 10 includes a master drive assembly 12 which includes a master arm 14 that has a master voice coil motor 16. The servo writing/erasure system 10 also comprises a hard drive assembly 18 which includes a hard drive arm 20 that has a hard drive voice coil motor 22.

To ensure that the master arm 14 is accurately positioned, a laser interferometer 24 is used to measure the position of the master arm 14. This information is relayed to a master arm servo controller 26, which moves the master arm 14 to the desired track of the data storage disk in which data is to be recorded. The laser interferometer 24 detects the position of the master arm 14 by monitoring light reflected off a reflector 26 mounted on the master arm 14. This information is relayed to the master arm servo controller 26, which also receives a position command signal from an external source, such as a computer, which is programmed to coordinate servo writing/erasure.

Figure 4B:
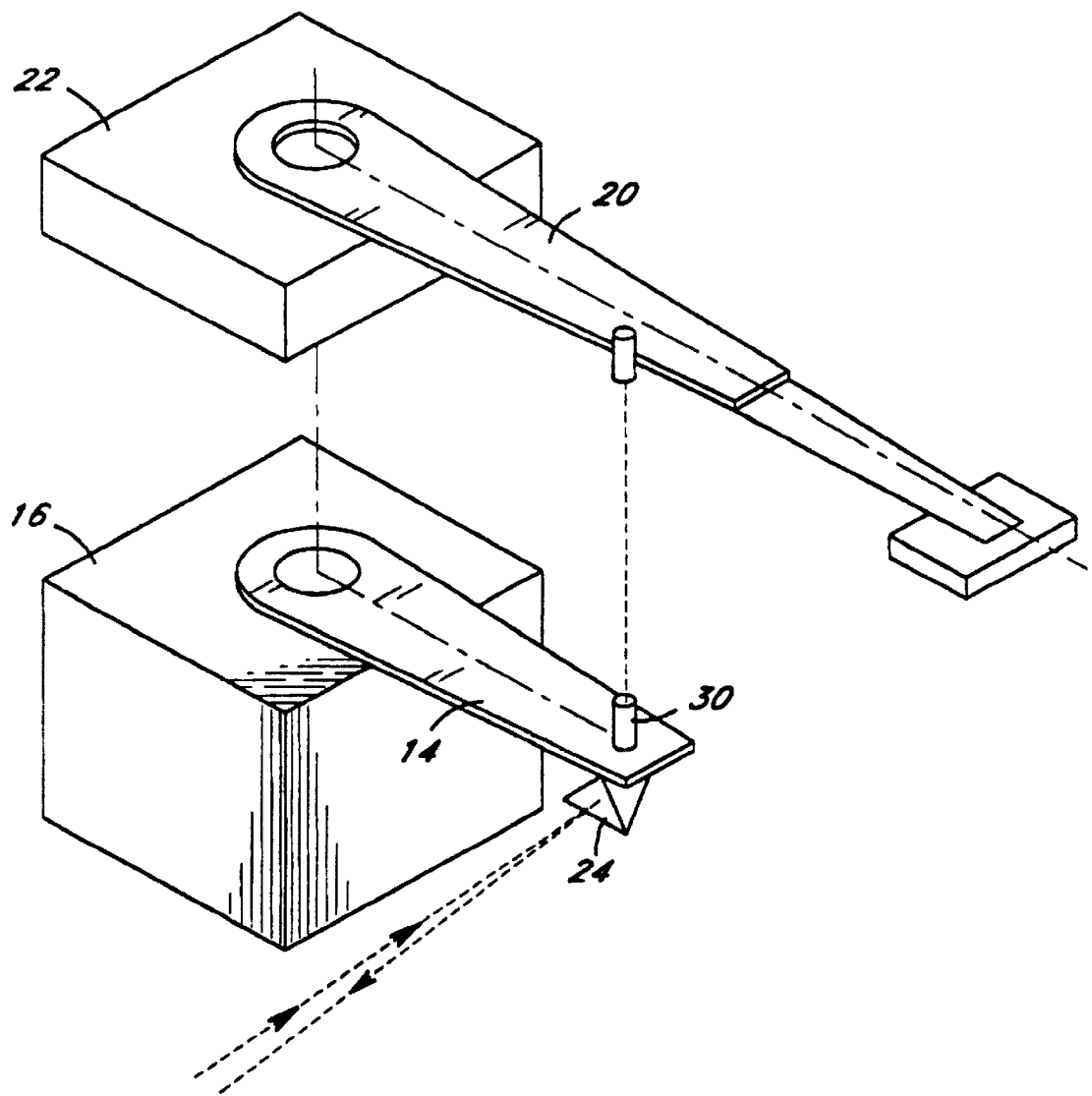
FIG. 4B is a perspective view of a portion of the servo-writing system of FIG. 4A.

A mechanical link between the master arm 14 and the hard drive arm 18 is established with the use of a mechanical push-pin 30, as shown in FIGS. 4A and 4B. The mechanical push-pin 30 is attached at one end to the master arm 14 and extends into the hard drive through an access slot. The hard drive arm 20 is biased by its motor to press against the side of the push pin and follow the master arm 14. This mechanical positioning system enables the hard drive arm 20 to track movement of the master arm 14, and thus assure writing of servo information at the proper radius of the hard drive assembly 18.

Figure 1:
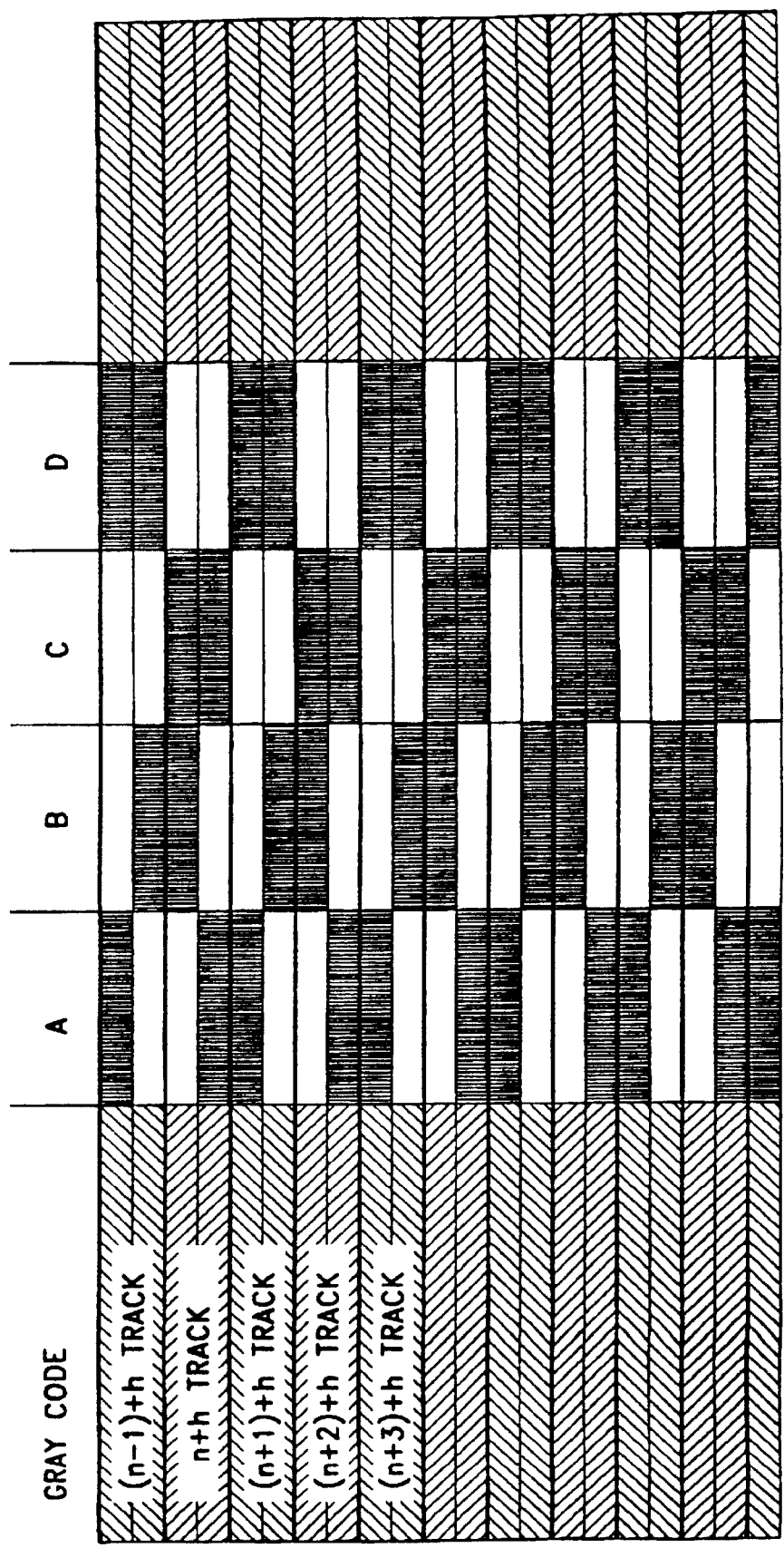
FIG. 1 illustrates the servo patterns on a disk pack of a hard drive assembly written using a conventional servo writing/erasure technique.
Figure 2A:
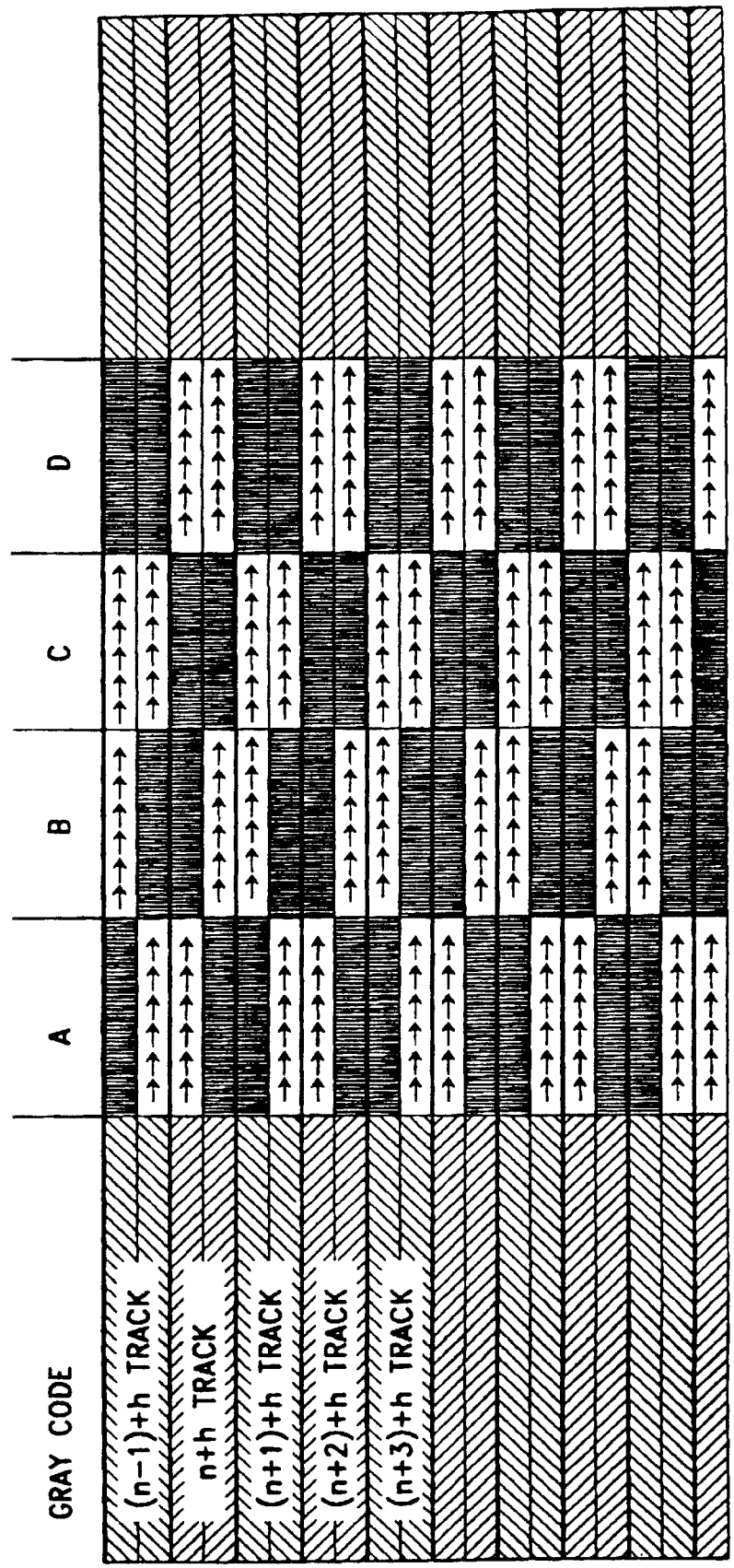
FIG. 2A illustrates the servo patterns and one direction of erasure using the conventional servo writing/erasure technique of FIG. 1.
Figure 2B:
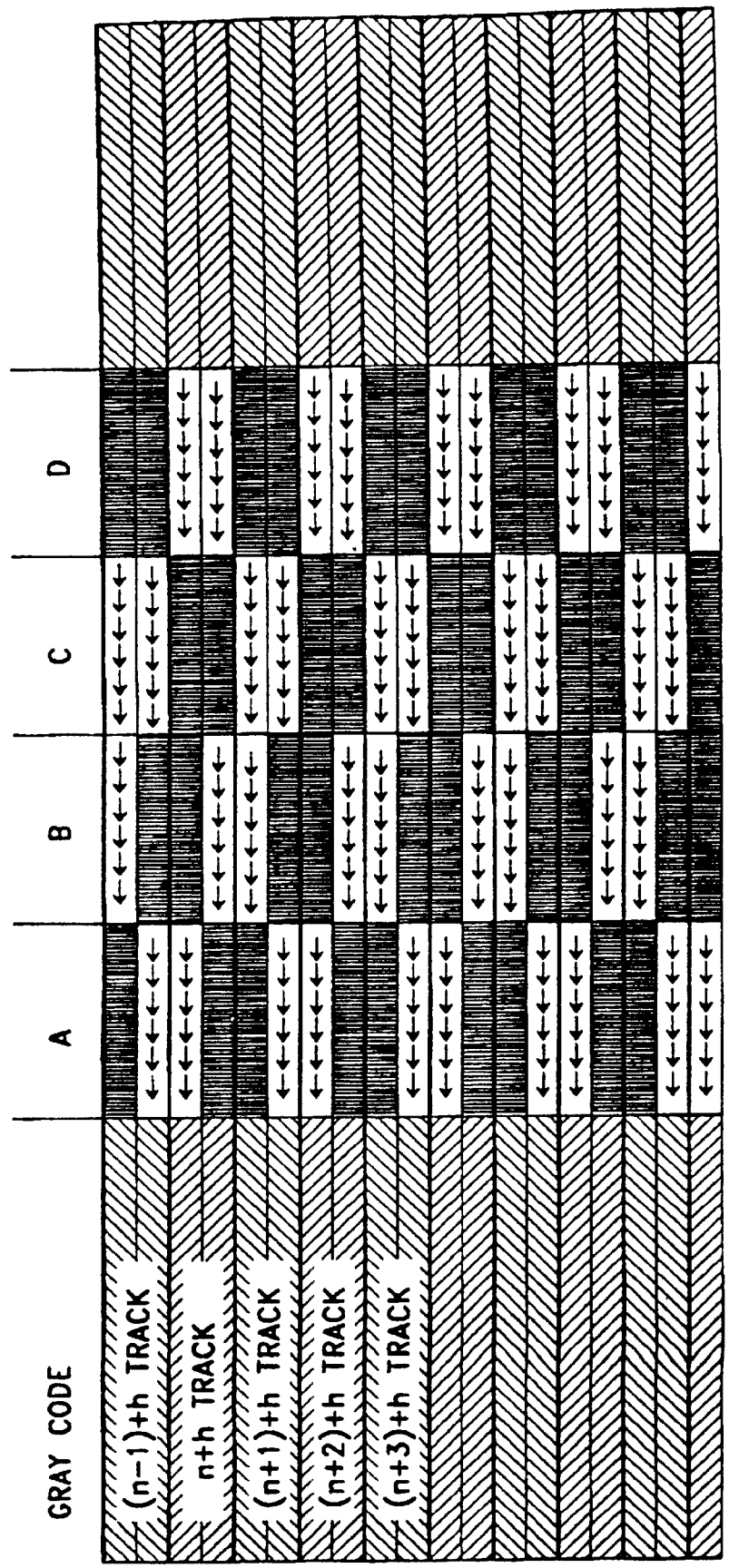
FIG. 2B illustrates the servo patterns and a second direction of erasure using the conventional servo writing/erasure technique of FIG. 1.
Figure 3A:
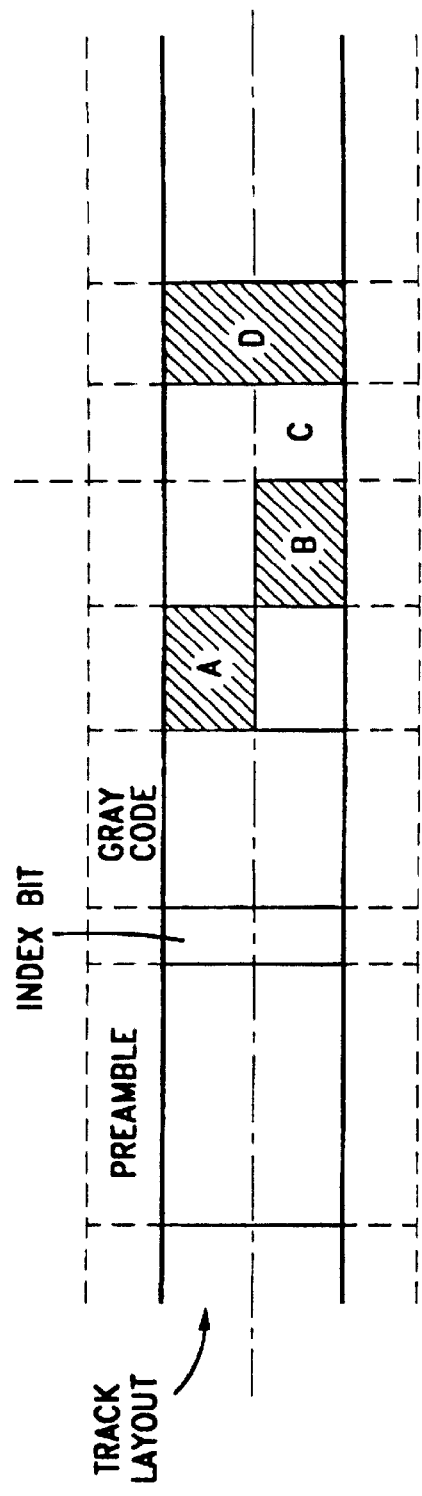
FIG. 3 illustrates an unstable servo signal that results from reading either the servo pattern of FIG. 2A or 2B.
Figure 3B:
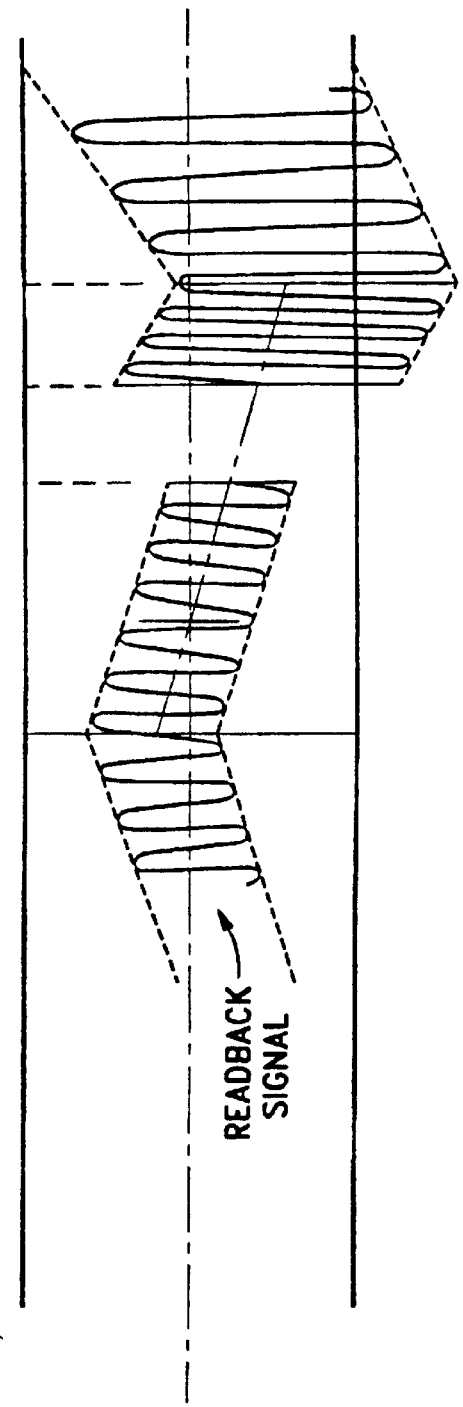
Figure 5:
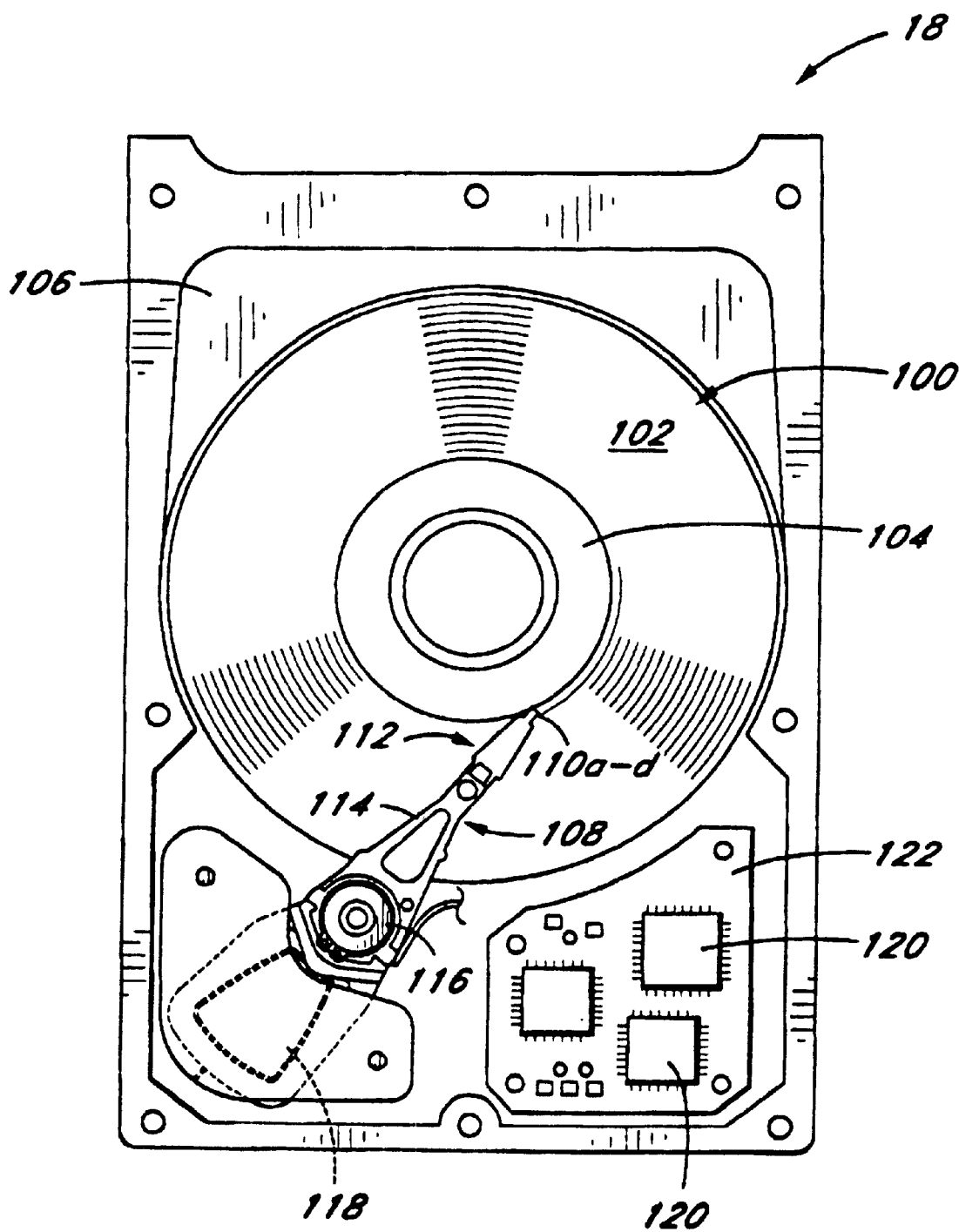
FIG. 5 illustrates a hard disk drive which utilizes one aspect of the method of the present invention.

FIG. 5 shows the hard disk drive 18 of FIG. 4A. The disk drive 18 includes a disk pack 100 with a plurality of disks 102 that are collectively rotated by a spin motor 104. The spin motor 104 corresponds to the hard drive arm motor 22 in FIG. 3A. The spin motor 104 is mounted to a base plate 106. Also mounted to the base plate 106 is an actuator arm assembly 108. The actuator arm assembly 108 corresponds to the hard drive arm 20 in FIG. 3A. The actuator arm assembly 108 includes a number of read/write (R/W) heads 110a–d mounted to corresponding flexure arms 112. The flexure arms 112 are attached to an actuator arm 114 that can rotate about a bearing assembly 116. The assembly 108 also contains a voice coil motor 118 which moves the heads 110a–d collectively relative to the disks 102. There is typically a single head 110a, 110b, 110c, or 110d for disk head side H0, H1, H2 or H3 (not shown), respectively, of the disk pack 100. The spin motor 104, voice coil motor 118 and the R/W heads 110a–d are coupled to a number of electronic circuits 120 mounted to a printed circuit board 122. The electronic circuits 120 typically include a read channel chip, a microprocessor-based controller and a random access memory (RAM) device.

Figure 6:
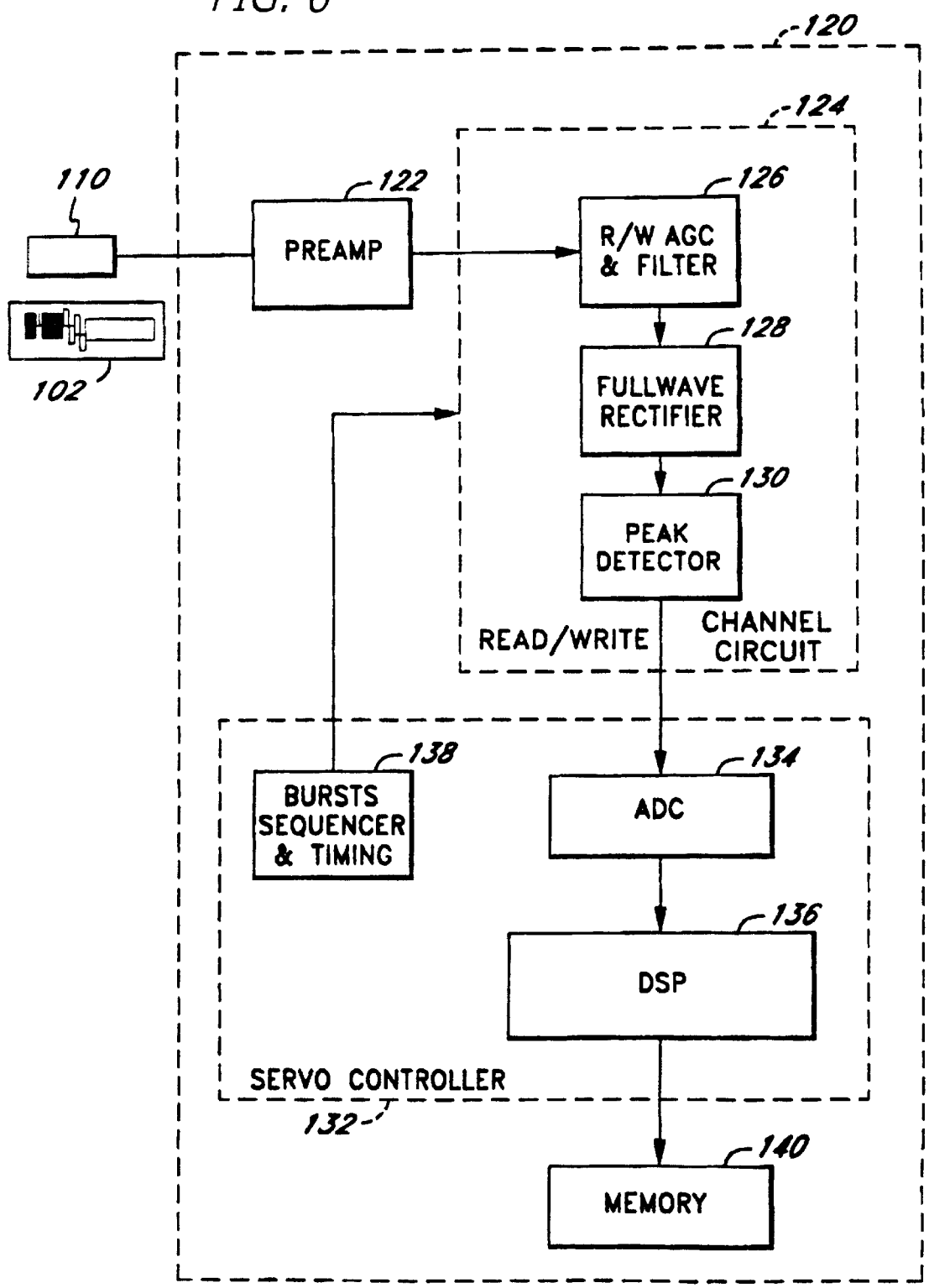
FIG. 6 is a block diagram of one of the electronic circuits 120 of FIG. 5.

FIG. 6 is a block diagram of one of the electronic circuits 120 of FIG. 5. The electronic circuit 120 includes a preamplifier circuit 122 which is coupled to a read/write (R/W) channel circuit 124. The read/write channel circuit 124 includes a R/W Automatic Gain Control (AGC), a filter circuit 126, a fullwave rectifier 128 and a peak detector 130. The electronic circuit 120 further comprises a microprocessor-based servo controller 132 which includes an analog-to-digital converter (ADC.) 134, a digital signal processor 136 and a burst sequencer & timing circuit 138. In addition, the electronic circuit 120 includes a random access memory (RAM) device 140.

The electronic circuit 120 is coupled to one of the magnetic heads 110 which senses the magnetic field of a magnetic disk 102. When reading the servo information located in the servo field region 10 on the disk 102, the head 110 generates a read signal that corresponds to the magnetic field of the disk 102. The read signal is first amplified by the preamplifier circuit 122, and then provided to the R/W channel circuit 124. The AGC data included in the read signal is provided to the R/W AGC and filter circuit 126. The AGC data provided by the read signal is monitored by the R/W AGC circuit portion of circuit 126 and the read signal is then filtered by the filter circuit located in the circuit 126. The fullwave rectifier 138 rectifies the read signal and provides the rectified read signal to the peak detector 140. In response, the peak detector 140 detects the amplitude of the read signal. The read signal is then provided to the ADC. 144 which provides digitized samples of the analog read signal. The digitized signal is then provided to a digital signal processor 146 which generates the position offset signals based on the servo information read by the head 110, as discussed in detail in the following sections. The values representing the position offset signals are stored in memory 140. The bursts sequencer and timing circuit 138 provide the timing required for the aforementioned processes.

As shown in FIG. 7, data is typically stored within sectors of radially concentric tracks located across the disk 100. A typical sector will have a preamble field 150 which includes automatic gain control (AGC) information and synchronization information, an address mark 152 which signifies the beginning of a sector, an index field 154 which indicates the beginning of the first sector of the track, a gray code field 156 that identifies the particular cylinder (tracks) of the sector, a servo field 158 which includes a number of servo bits A, B, C, D, and a data field 160 which contains the data. In one embodiment, the A bit and the B bit that have a common boundary located at the track centerline, and the B bit is 180° out of phase with respect to the A bit. In this embodiment, the B bit and the C bit also have a common boundary located along one edge of the track, and the C bit is 90° out of phase with respect to the B bit, and 270° out of phase with respect to the A bit. In the same embodiment, the C bit and the D bit have a common boundary located along one edge of the track, and the D bit is 180° out of phase with respect to the C bit, and 90° out of phase with respect to the A bit. It is understood by one of ordinary skill in the art that any number of servo patterns may be used to provide servo information. The servo pattern described herein is used only for present discussion purposes. The electronic circuits 120 utilize the servo bits A, B, C and D to maintain the heads 110 on the centerline CL of a corresponding track. The heads 110 can magnetize and sense the magnetic field of the disk heads H0–H3.

Figure 8A:
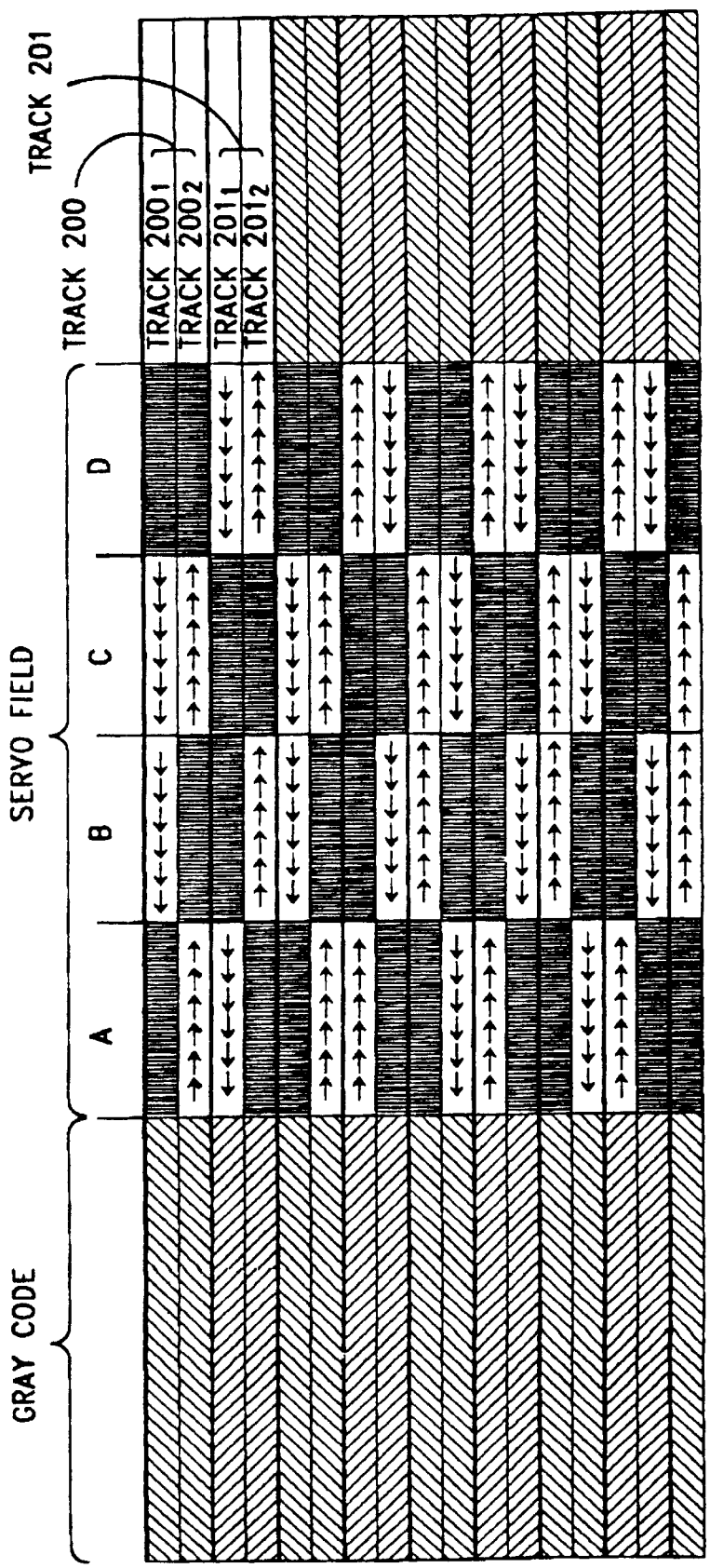
FIG. 8A illustrates one embodiment of a servo sector of a disk with servo information written using the alternate erasure servo writing/erasure scheme, in accordance with the teachings of the present invention.

FIG. 8A illustrates one embodiment of a servo sector of a disk with servo information written using the alternate erasure servo writing/erasure scheme, in accordance with the teachings of the present invention. In writing the servo patterns of a disk, the servo writing/erasure procedure of the present invention first directs the master arm 14 to position the disk drive arm 20 mechanically at the extreme outside track. It then directs the R/W heads 110 to write the servo patterns in accordance with the alternate writing and erasure scheme of the present invention. In particular, the master arm 14 positions the R/W heads 110 at a first predetermined half of the extreme outside track, such as track portion $200_1$ of track 200. The heads 110 are then directed to write the A burst in a first predetermined location of a servo sector, such as servo sector 158. Next, the heads 110 are directed to erase a second predetermined location on the servo sector using a first predetermined field, corresponding to a location adjacent to the first predetermined location on the servo sector 158. In one embodiment, the first predetermined field is a positive D.C. field. The master arm 14 then positions the R/W heads 110 at a third predetermined location of the servo sector 158, where the heads 110 are directed to erase the third predetermined location on the servo sector, using the first predetermined field (i.e., a positive D.C. field). The heads 110 are then directed to proceed to a fourth predetermined location on the servo sector, where they are directed to write the D burst.

The heads 110 are then directed to advanced to the second predetermined half of the same track, such as track portion $200_2$ of the track 200, where it is first directed to erase the first predetermined location of the servo sector 158 using a second predetermined field that is opposite in polarity to the first predetermined filed. In one embodiment, the second predetermined field is a D.C. negative field. Next, the heads 110 are directed to advance to a second predetermined location (adjacent to the first predetermined location) of the second predetermined half of the track 200, where they are directed to write the B burst. The heads 110 are then directed to proceed to the third predetermined location (adjacent to the second predetermined location) of the second predetermined half of the track 200, where they are directed to erase the third predetermined location using the second predetermined field. Next, the heads 110 are directed to proceed to the fourth predetermined location on the second predetermined half, where they are directed to write the D burst.

Upon completion of the writing and erase process for the track 200, the heads 110 are directed to proceed to the first half $201_1$ of the next track 201, where they are directed to erase the first predetermined location on the first half track $201_1$ using the first predetermined field. Next, the heads 110 proceed top the second predetermined location, where they are directed to write the B burst. The heads 110 then advance to the third predetermined location on the first predetermined half of the second track 201, where they are directed to write the C burst. The heads 110 are then directed to proceed to the fourth predetermined location on the first half track $201_1$, where they are directed to erase the fourth location using the first predetermined field.

The heads 110 then proceed to the second half $201_2$ of the same track, i.e., the second track 201, where the writing and erase process for the second half $201_2$ track continues. In particular, the heads 110 are directed to the first location of the second half track 2012, where they are directed to write the A burst. The heads 110 then proceed to the second predetermined location, where they are directed to erase using the second predetermined field. Next, the heads 110 proceed to the third predetermined location, where they are directed to write the C burst. The heads 110 then proceed to the fourth predetermined location, where they are directed to erase the subject area using the second predetermined field.

The heads 110 are directed to continue with the alternate writing and erasure process as described above, for a predetermined number of tracks on the disk side.

Upon reaching the first track that is just beyond the inner diameter crash stop, for example, at track 400, the servo writing/erasure procedure of the present invention directs each one of the heads 110a–d to terminate the writing/erase process.

Figure 8B:
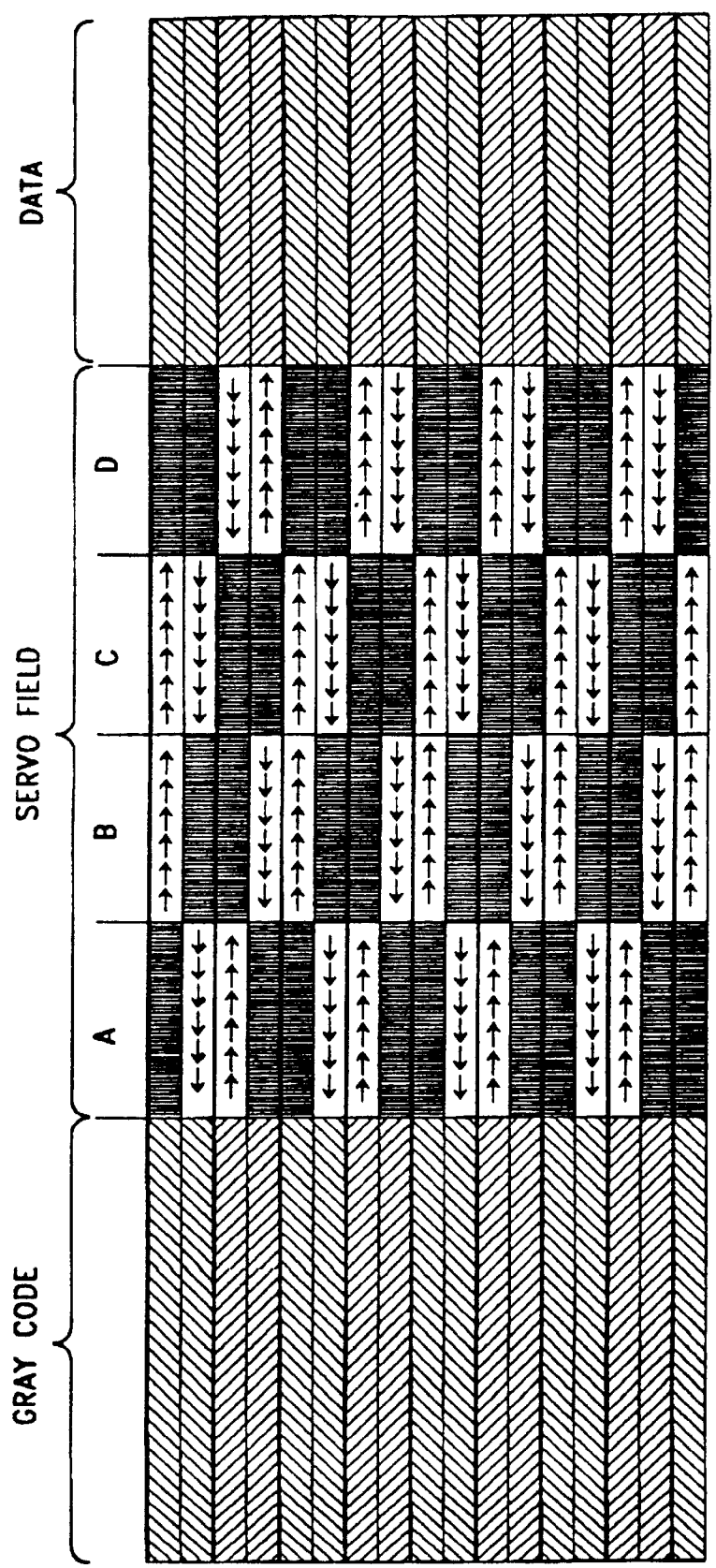
FIG. 8B illustrates a second embodiment of a servo sector of a disk with servo information written using the alternate erasure servo writing/erasure scheme, in accordance with the teachings of the present invention.
Figure 8D:
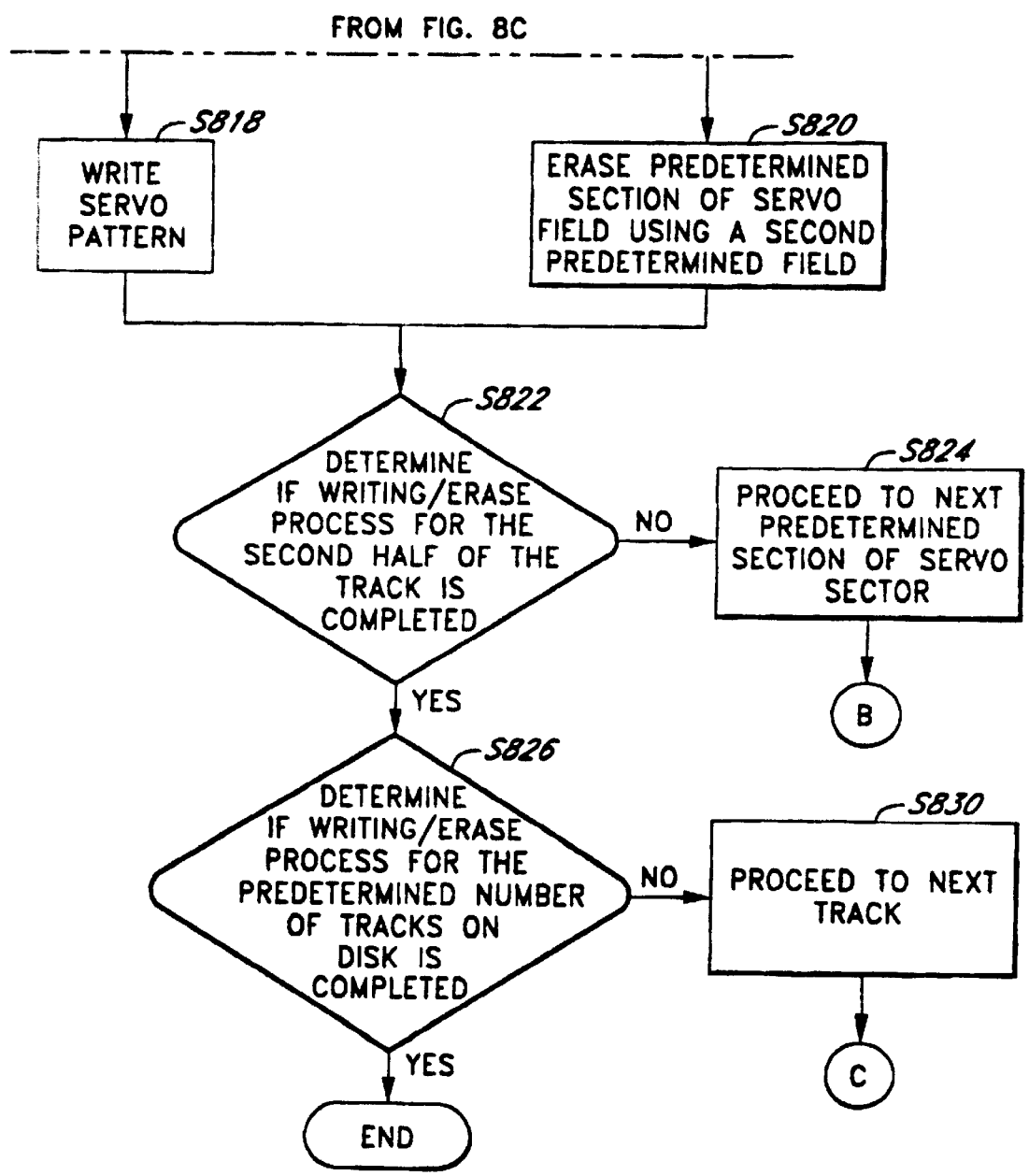

FIG. 8B illustrates a second embodiment of a servo sector of a disk with servo information written using the alternate erasure servo writing/erasure scheme, in accordance with the teachings of the present invention. In this embodiment, the alternate erase servo writing/erasure scheme is identical to the servo writing scheme S100, with the exception that the first predetermined field used for the erase process is a D.C. positive field and the second predetermined field is a D.C. negative field.

FIG. 8C is a flowchart illustrating one embodiment of the process(es) of writing servo information as shown in FIGS. 8A and/or 8B. Beginning from a start state, the process S800 of the present invention proceeds to process step S202 where it directs the master drive arm 14 (FIG. 3A) to position the disk drive arm 20 to a predetermined location such as a first predetermined section of the servo sector of the first half of track 200 (i.e., track $200_1$). The process S800 then directs the R/W heads 110 to begin writing servo patterns using the alternate erase process of the present invention, as shown in process steps S804–S826. In particular, the process S800 first determines if an erase or a write process is to be performed at the predetermined location (decision step S804). If a write process is to be performed, the process S800 directs the head 110 to write the servo pattern for first section of the servo sector (step S806). The process S800 then proceeds to decision step S810. If an erase process is to be performed as determined in step S804, the process S800 directs the head 110 to erase the predetermined section of the servo sector using a first predetermined field (step S808). The process S800 then proceeds to decision step S810, where it determines if the servo writing/erase processes for the first half track is complete. If not, the process S800 proceeds to process step S812, where the head 110 is directed to proceed to the next predetermined section of the servo sector in the first half track e.g., track $200_1$. The process S800 then returns back to decision step S804.

If the servo writing/erase process for the predetermined first half track is completed, the process S800 directs the head 110 to proceed to the second half track e.g., track 200$_2$, as shown in process step S814. The process S800 then advances to decision step S816, where it determines if an erase or a write process is to be performed at the predetermined location. If a write process is to be performed, the process S800 directs the head 110 to write the servo pattern for first section of the servo sector (step S818). The process S800 then proceeds to decision step S822. If an erase process is to be performed, the process S800 directs the head 110 to erase the predetermined section of the servo sector using a second predetermined field (step S820). The process S800 then proceeds to decision step S822, where it determines if the servo writing/erase processes for the second half track is complete. If not, the process S800 proceeds to process step S824, where the head 110 is directed to proceed to the next predetermined section of the servo sector in the second half track e.g., track 200$_2$. The process S800 then returns back to decision step S816.

If the servo writing/erase process for the predetermined second half track is completed, the process S800 determines if the writing/erase process a predetermined number of tracks on the disk 102 is complete, as shown in decision step S826. If not, the process proceeds to process step S830, where it directs the head 110 to proceed to the first half of the next track e.g., track 201. The process then returns to process step S804. Otherwise, the process S800 terminates. In the process 800, the first predetermined field may provided by using a current with either a positive or a negative polarity; the second predetermined field will then be provided using a current of an opposite polarity (i.e., a negative or a positive polarity, respectively).

Figure 9A:
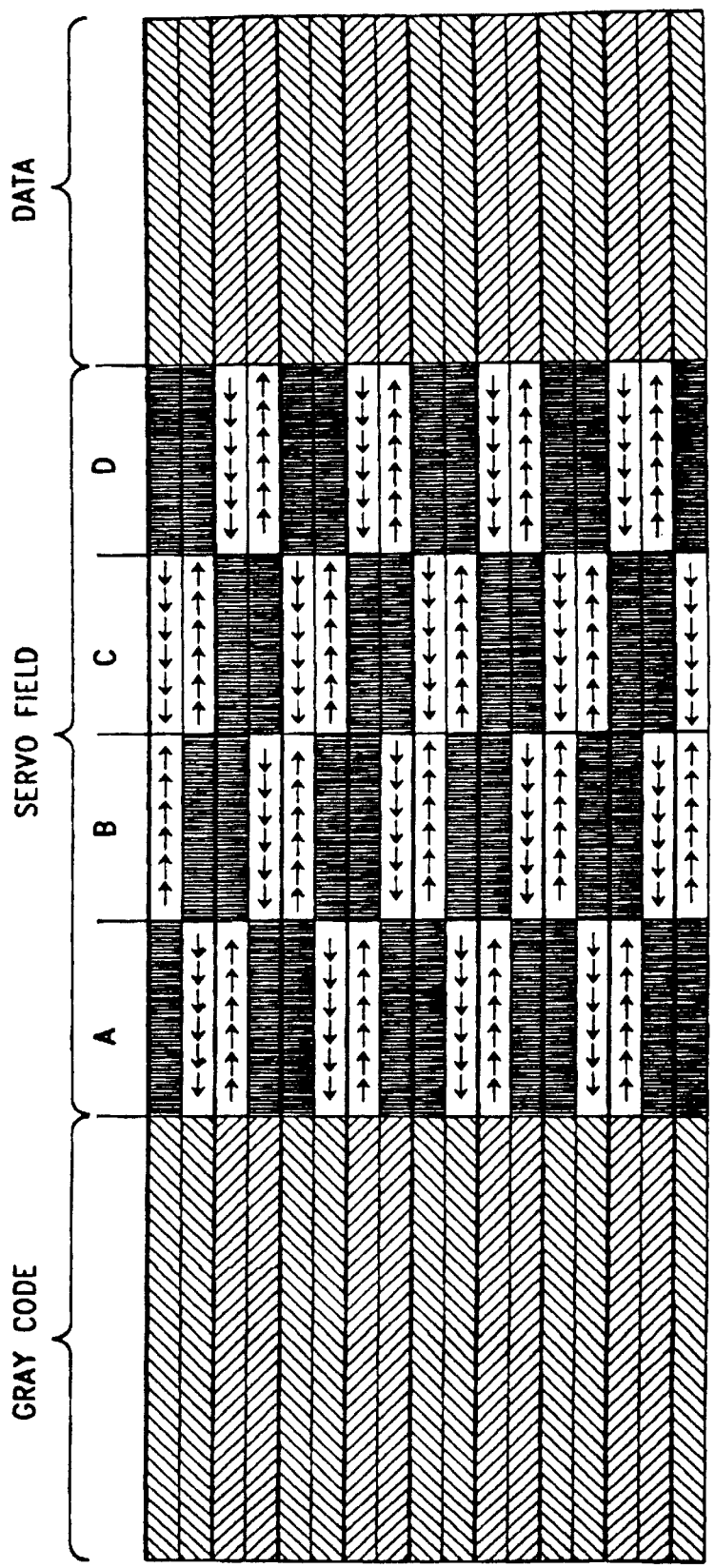
FIG. 9A illustrates a third embodiment of a servo sector of a disk with servo information written using the alternate erasure servo writing/erasure scheme, in accordance with the teachings of the present invention.

FIG. 9A illustrates a third embodiment of a servo sector of a disk with servo information written using the alternate erasure servo writing/erasure scheme, in accordance with the teachings of the present invention. In writing the servo patterns of a disk, the servo writing/erasure procedure of the present invention first directs the master arm 14 to position the disk drive arm 20 mechanically at the extreme outside track. It then directs the R/W heads 110 to write the servo patterns in accordance with the alternate writing and erasure scheme as described above. In particular, the master arm 14 positions the R/W heads 110 to a first predetermined half of the extreme outside track, such as track portion 200$_1$ of track 200. The heads 110 are then directed to write the A burst in a first predetermined location of a servo sector, such as servo sector 158. Next, the heads 110 are directed to erase a second predetermined location on the servo sector using a first predetermined field, corresponding to a location adjacent to the first predetermined location on the servo sector 158. In one embodiment, the first predetermined field is a positive D.C. field. The master arm 14 then positions the R/W heads 110 to a third predetermined location of the servo sector 158, where the heads 110 are directed to erase the third predetermined location on the servo sector, using a second predetermined field. The heads 110 are then directed to proceed to a fourth predetermined location on the servo sector, where they are directed to write the D burst.

The heads 110 are then directed to advanced to the second predetermined half, such as track portion 200$_2$ of the track 200, where it is first directed to erase the first predetermined location of the servo sector 158 using the second predetermined field. In one embodiment, the second predetermined field is a D.C. negative field. Next, the heads 110 are directed to advance to the second predetermined location of the second predetermined half of the track 200 (i.e., track portion 200$_2$), where they are directed to write the B burst. The heads 110 are then directed to proceed to the third predetermined location of the second predetermined half of the track 200 (i.e., track portion 200$_2$), where they are directed to erase the third predetermined location using the first predetermined field. Next, the heads 110 are directed to proceed to the fourth predetermined location on the second predetermined half of the track 200 (i.e., track portion 200$_2$), where they are directed to write the D burst.

Upon completion of the writing and erase process for the track 200, the heads 110 are directed to proceed to the first half 201$_1$ of the next track 201, where they are directed to erase the first predetermined location on the first half track 201$_1$ using the first predetermined field. Next, the heads 110 proceed top the second predetermined location, where they are directed to write the B burst. The heads 110 then advance to the third predetermined location on the first predetermined half of the second track 201, where they are directed to write the C burst. The heads 110 are then directed to proceed to the fourth predetermined location on the first half track 201$_1$, where they are directed to erase the fourth location using the second predetermined field.

The heads 110 then proceed to the second half 201$_2$ of the second track 201, where the writing and erase process for the second half 201$_2$ track continues. In particular, the heads 110 are directed to the first location of the second half track 2012, where they are directed to write the A burst. The heads 110 then proceed to the second predetermined location, where they are directed to erase using the second predetermined field. Next, the heads 110 proceed to the third predetermined location, where they are directed to write the C burst. The heads 110 then proceed to the fourth predetermined location, where they are directed to erase the subject area using the first predetermined field.

The heads 110 are directed to continue with the alternate writing and erasure process as described above, for a predetermined number of tracks on the disk side. In this third embodiment, the first predetermined field is a D.C. negative filed, while the second predetermined field is a D.C. positive field.

Upon reaching the first track that is just beyond the inner diameter crash stop, for example, at track 400, the servo writing/erase procedure of the present invention directs each one of the heads 110a–d to terminate the writing/erase process.

Figure 9B:
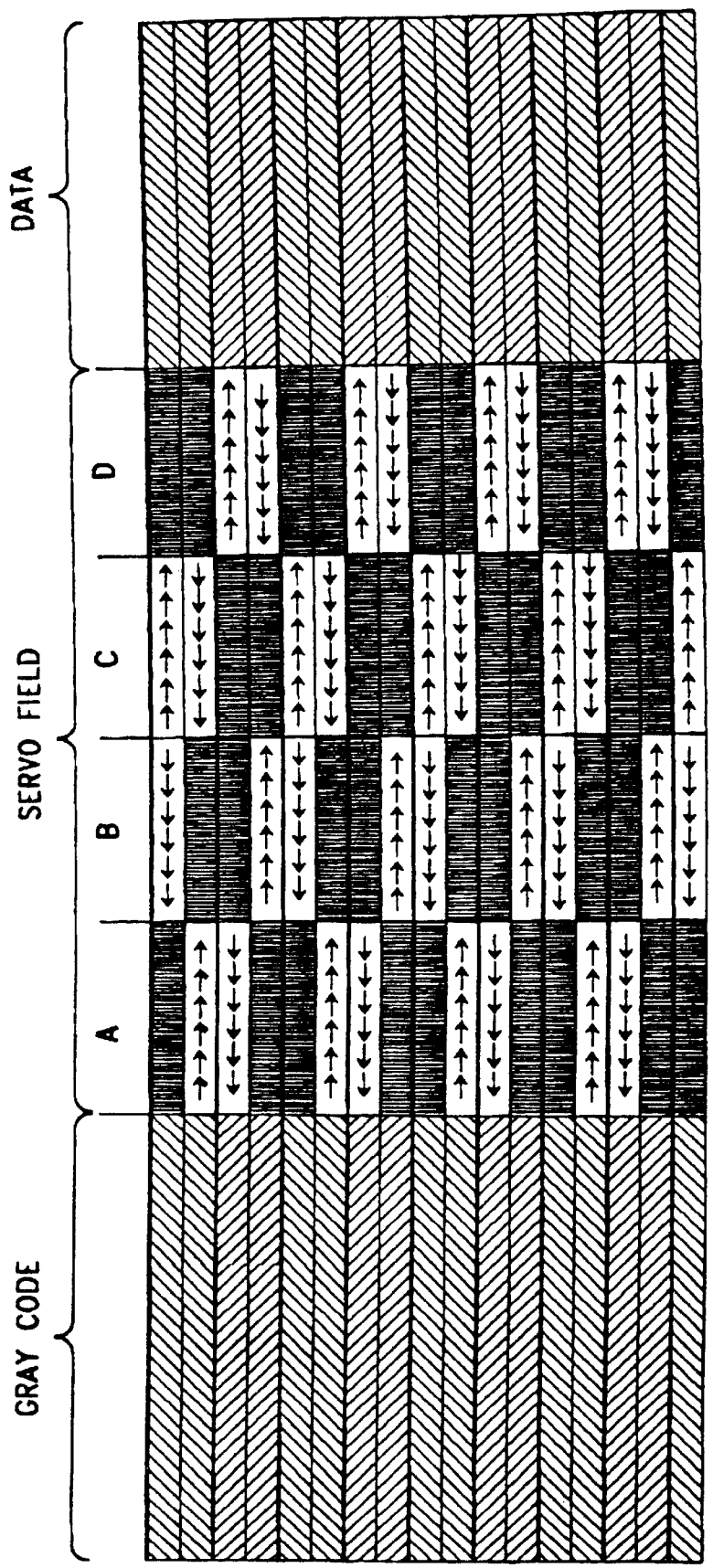
FIG. 9B illustrates a fourth embodiment of a servo sector of a disk with servo information written using the alternate erasure servo writing/erasure scheme, in accordance with the teachings of the present invention.
Figure 9D:
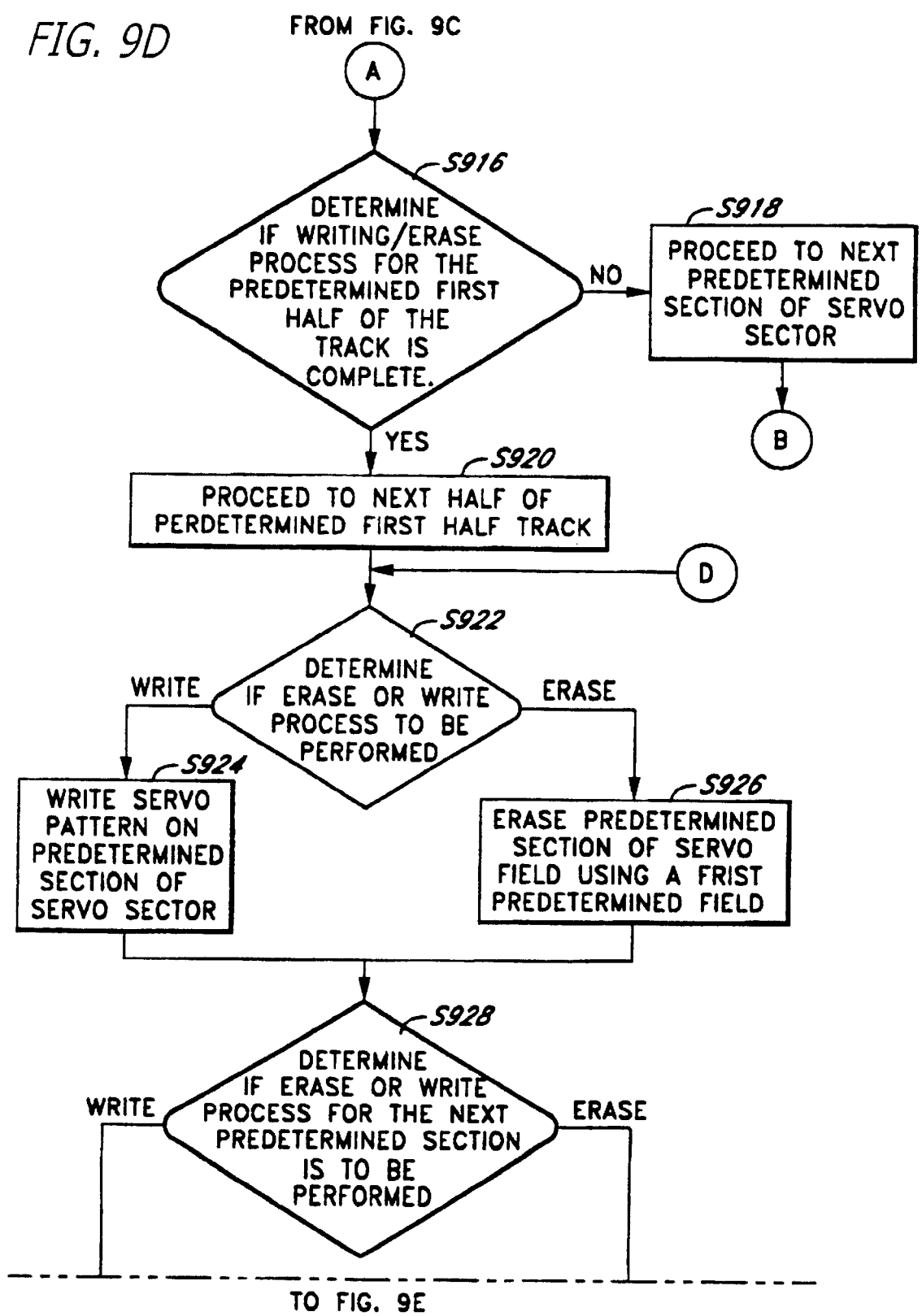
Figure 9E:
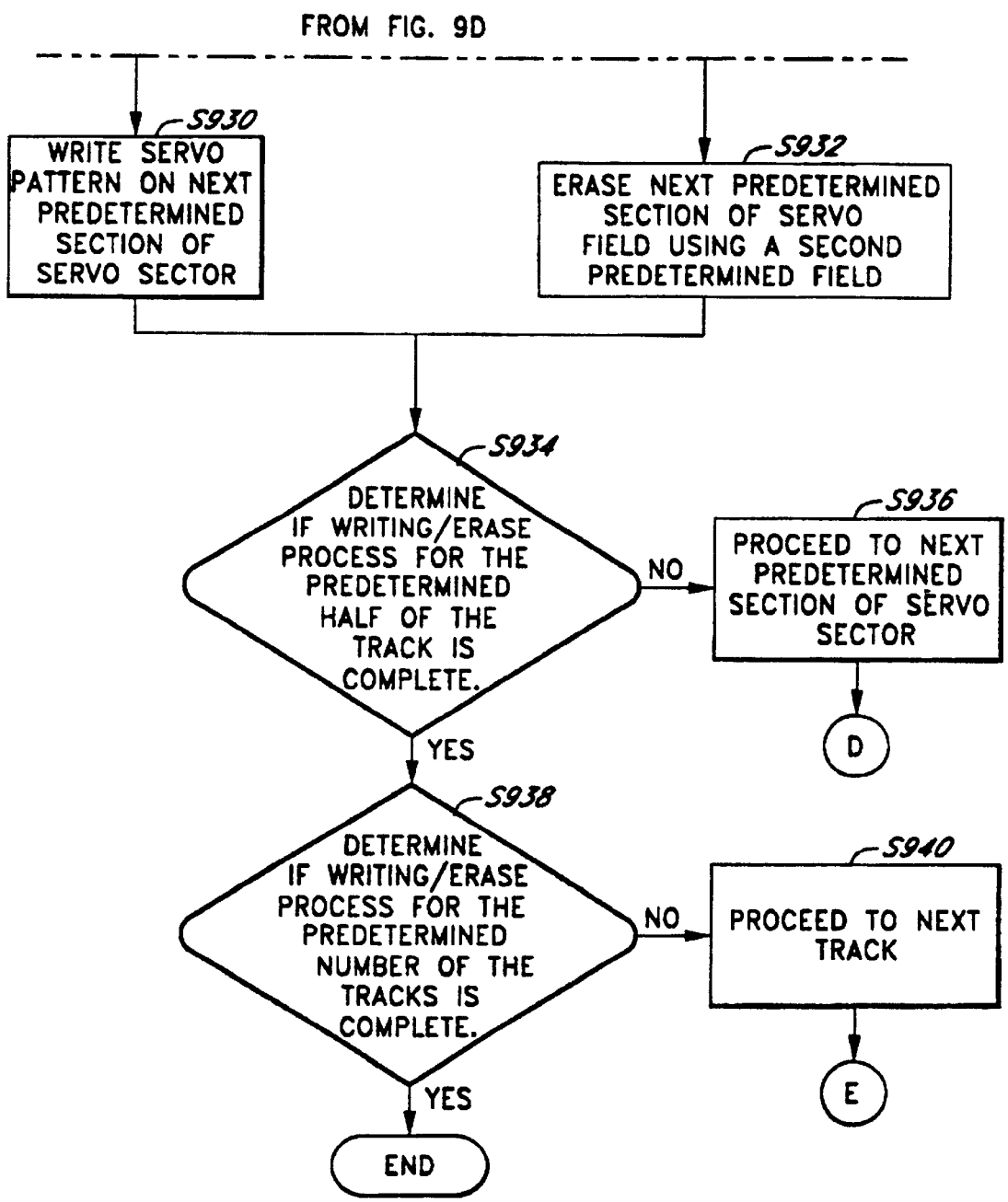

FIG. 9B illustrates a fourth embodiment of a servo sector of a disk with servo information written using the alternate erasure servo writing/erasure scheme, in accordance with the teachings of the present invention. In this embodiment, the alternate erase servo writing/erasure scheme is identical to the servo writing scheme S100, with the exception that the first predetermined field used for the erase process is a D.C. positive field and the second predetermined field is a D.C. negative field.

FIG. 9C is a flowchart illustrating one embodiment of the process(es) of writing servo information as shown in FIGS. 9A and/or 9B. Beginning from a start state, the process S900 of the present invention proceeds to process step S902 where it directs the master drive arm 14 (FIG. 3A) to position the disk drive arm 20 to a predetermined location such as a first predetermined section of the servo sector of the first half of track 200 (i.e., track 200$_1$). The process S900 then directs the R/W heads 110 to begin writing servo patterns using the alternate erase process of the present invention, as shown in process steps S904–S940. In particular, the process S900 first determines if an erase or a write process is to be performed at the predetermined location (decision step S904). If a write process is to be performed, the process S900 directs the head 110 to write the servo pattern for first section of the servo sector (step S906). The process S900 then proceeds to decision step S910. If an erase process is to be performed, the process S900 directs the head 110 to erase the predetermined section of the servo sector using a first predetermined field (step S908).

The process S900 then proceeds to decision step S910, where it determines if an erase or a write process for the next predetermined section in the servo sector is to be performed. If it is determined that a write process is to be performed, the process S900 proceeds to process step S912, where the servo pattern is written on the next predetermined section of the servo sector. The process S900 then advances to decision step S916. If it is determined that an erase process is to be performed, the process S900 proceeds to process step S914, where the next predetermined section of the servo sector is erased using a second predetermined field (that has a polarity opposite to that of the first predetermined field). The process S900 then proceeds to decision step S916.

At decision step S916, the process S900 determines if the servo writing/erase processes for the predetermined first half track is completed. If not, the process S900 proceeds to process step S918, where the head 110 is directed to proceed to the next predetermined section of the servo sector in the predetermined first half track e.g., track $200_1$. The process S900 then returns back to decision step S904.

If the servo writing/erase process for the predetermined first half track is completed, the process S900 directs the head 110 to proceed to the second half of the predetermined track e.g., the second half of track $200_2$, as shown in process step S920. The process S900 then advances to decision step S922, where it determines if an erase or a write process is to be performed at the predetermined location. If a write process is to be performed, the process S900 directs the head 110 to write the servo pattern for first section of the servo sector (step S924). The process S900 then proceeds to decision step S928. If an erase process is to be performed, the process S900 directs the head 110 to erase the predetermined section of the servo sector using a first predetermined field (step S926). The process S900 then proceeds to decision step S928.

At decision step S928, the process S900 determines if an erase or a write process for the next predetermined section in the servo sector is to be performed. If it is determined that a write process is to be performed, the process S900 proceeds to process step S930, where the servo pattern is written on the next predetermined section of the servo sector. The process S900 then advances to decision step S934. If it is determined that an erase process is to be performed, the process S900 proceeds to process step S932, where the next predetermined section of the servo sector is erased using a second predetermined field. The process S900 then proceeds to decision step S934, where it determines if the servo writing/erase processes for the second half track is complete. If not, the process S900 proceeds to process step S936, where the head 110 is directed to proceed to the next predetermined section of the servo sector in the second half track e.g., track $200_2$. The process S900 then returns back to decision step S922.

If the servo writing/erase process for the predetermined second half track is completed, the process S900 determines if the writing/erase process a predetermined number of tracks on the disk 102 is complete, as shown in decision step S938. If not, the process proceeds to process step S940, where it directs the head 110 to proceed to the first half of the next track e.g., the first half of track 201. The process S900 then returns to process step S904. Otherwise, the process S900 terminates. In the process S900, the first predetermined field may provided by using a current with either a positive or a negative polarity; the second predetermined field will then be provided using a current of an opposite polarity (i.e., a negative or a positive polarity, respectively).

Figure 10A:
FIG. 10A illustrates an exemplary stable servo signal that results from reading the servo pattern of the present invention.
Figure 10B:
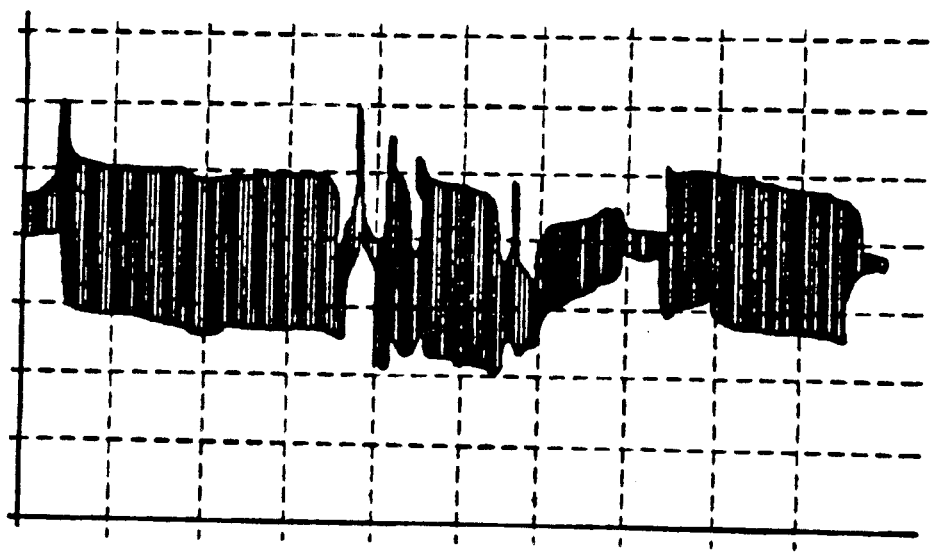
FIG. 10B illustrates an exemplary unstable servo signal that results from reading the servo pattern of the prior art.

FIG. 10A illustrates an exemplary unstable servo signal that results from reading the servo pattern of the prior art. As shown, the servo signal obtained through the use of a conventional writing and erasure technique results in a servo pattern with a shifted baseline. FIG. 10B illustrates an exemplary stable servo signal that results from reading the servo pattern of the present invention. As can be observed from FIG. 10B, the servo signal obtained through the use of the technique(s) of the present invention results in a servo pattern with a reduced baseline shift, typically in the order of 25% when compared to that obtained through conventional techniques.

Through the implementation of the technique of the present invention, servo pattern with reduced baseline shift may be obtained. As a result, the manufacturing productivity of high-density and high performance hard disk drives may be significantly increased.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A method for providing servo information on a disk in a hard disk drive, comprising:

providing a disk having a plurality of tracks, each of said plurality of tracks having at least one servo sector having a first half track portion and a second half track portion;

erasing a first location of the first half track of said at least one servo sector using a first predetermined field; and erasing a first location of the second half track of said at least one servo sector using a second predetermined field, said first location of said first half track being adjacent to said first location of said second half track said second predetermined field having a polarity different than said first predetermined field.

2. The method as recited in claim 1, further comprising:

writing servo information on a second location of the first half track portion of said at least one servo sector.

3. The method as recited in claim 1, further comprising:

erasing a second location of the first half track portion of said at least one servo sector using the first predetermined field; and erasing a second location of the second half track portion of said at least one servo sector using the second predetermined field.

4. The method as recited in claim 3, wherein said first location of said first half track portion of said at least one servo sector is adjacent to said second location of said first half track portion of said at least one servo sector.

5. The method as recited in claim 3, wherein said second location of said second half track portion of said at least one servo sector is adjacent to said first location of said second half track portion of said at least one servo sector.

6. The method as recited in claim 1, further comprising:
writing servo information on a second location of the second half track portion of said at least one servo sector.

7. The method as recited in claim 1, wherein said first predetermined field is a negative, direct current induced field.

8. The method as recited in claim 1, wherein said first predetermined field is a positive, direct current induced field.

9. The method as recited in claim 1, wherein said second predetermined field is a negative, direct current induced field.

10. The method as recited in claim 1, wherein said second predetermined field is a positive, direct current induced field.

11. The method as recited in claim 1, wherein the polarity of said first predetermined field is opposite to the polarity of said second predetermined field.

12. A disk for a hard disk drive, comprising:
a disk having a plurality of tracks, each of said plurality of tracks having at least one servo sector having a first half track portion and a second half track portion, said disk having a first location on the first half track portion that is erased using a first predetermined field, said disk having a first location on the second half track portion that is erased using a second predetermined field, said first location of said first half track being adjacent to said first location of said second half track, said second predetermined field having a polarity different than said first predetermined field.

13. The disk as recited in claim 12, wherein said disk further comprises a second location of the first half track portion of said at least one servo sector that has servo information.

14. The disk as recited in claim 12, comprising a second location on the second half track portion of said at least one servo sector that has servo information.

15. The disk as recited in claim 12, wherein the polarity of said first predetermined field is opposite to the polarity of said second predetermined field.

16. A hard disk drive, comprising:
a housing;
a spin motor mounted to said housing;
an actuator arm mounted to said spin motor;
a disk attached to said spin motor, said disk having at least one side with a plurality of tracks, each of said plurality of tracks having at least one servo sector having a first half track portion and a second half track portion, said disk having a first location on the first half track portion that is erased using a first predetermined field, said disk having a first location on the second half track portion that is erased using a second predetermined field, said first location of said first half track being adjacent to said first location of said second half track, said second predetermined field having a polarity different that said first predetermined field;
a read/write head mounted to said actuator arm for reading said at least one side of said disk.

17. The hard disk as recited in claim 16, wherein said disk further comprises a second location of the first half track portion of said at least one servo sector that has servo information.

18. A method for providing servo information on a disk in a hard disk drive, comprising:
providing a disk having a plurality of tracks, each of said plurality of tracks having at least one servo sector having a first half track portion and a second half track portion;
erasing a first location of the first half track portion of said at least one servo sector using a first predetermined field; and
erasing a second location of the first half track portion of said at least one servo sector using a second predetermined field, said second predetermined field having a polarity different than said first predetermined field, said first location of the first half track portion being adjacent to said second location of the first half track portion.

19. The method as recited in claim 18, further comprising:
writing servo information on a third location of the first half track portion of said at least one servo sector.

20. The method as recited in claim 18, further comprising:
erasing a first location of a second half track portion of said at least one servo sector using said first predetermined field; and
erasing a second location of the second half track portion of said at least one servo sector using said second predetermined field.

21. The method as recited in claim 18, further comprising:
erasing a first location of a second half track portion of said at least one servo sector using said second predetermined field; and
erasing a second location of the second half track portion of said at least one servo sector using said first predetermined field.

22. The method as recited in claim 21, wherein the first predetermined field is a negative, direct current induced field.

23. The method as recited in claim 21, wherein the first predetermined field is a positive, direct current induced field.

24. The method as recited in claim 21, wherein the second predetermined field is a negative, direct current induced field.

25. The method as recited in claim 21, wherein the second predetermined field is a positive, direct current induced field.

26. The method as recited in claim 21, wherein said first location of said second half track portion of said at least one servo sector is adjacent to said first location of said first half track portion of said at least one servo sector.

27. The method as recited in claim 21, wherein said second location of said second half track portion of said at least one servo sector is adjacent to said second location of said first half track portion of said at least one servo sector.

28. The method as recited in claim 18, further comprising:
writing servo information on a third location of the second half track portion of said at least one servo sector.

29. The method as recited in claim 18, wherein the polarity of said first predetermined field is opposite to the polarity to said second predetermined field.

30. A disk for a hard disk drive, comprising:
a disk having a plurality of tracks, each of said plurality of tracks having at least one servo sector having a first half track portion and a second half track portion, said disk including:
a first location on the first half track portion that is erased using a first predetermined field; and
a second location on the first half track portion that is erased using a second predetermined field, said second predetermined field having a polarity different than said first predetermined field, said first location on the first half track portion being adjacent to said second location on the first half track portion.

31. The disk as recited in claim 30, wherein said disk further comprising a third location of the first half track portion of said at least one servo sector that has servo information.

32. The disk as recited in claim 30, wherein said disk further comprises a first location on the second half track portion of said at least one servo sector that is erased using the second predetermined field, said disk having a second location on the second half track portion of said at least one servo sector that is erased using the first predetermined field.

33. The disk as recited in claim 32, wherein said disk further comprises a third location of the second half track portion of said at least one servo sector that has servo information.

34. The hard disk drive as recited in claim 18, wherein the polarity of said first predetermined field is the opposite to the polarity of said second predetermined field.

35. A hard disk drive, comprising:

a housing;

a spin motor mounted to said housing;

an actuator arm mounted to said spin motor;

a disk attached to said spin motor, said disk having at least one side with a plurality of tracks, each of said plurality of tracks having at least one servo sector having a first half track portion and a second half track portion; said disk having a first location on the first half track portion that is erased using a first predetermined field; said disk further having a second location on the first half track portion that is erased using a second predetermined field, said second predetermined field having a polarity different than said first predetermined field; said first location on said first half track portion being adjacent to said second location on said first half track portion;

a read/write head mounted to said actuator arm for reading said at least one side of said disk.

36. The hard disk drive as recited in claim 35, wherein said disk further comprises a third location of the first half track portion of said at least one servo sector that has servo information.

37. A method for providing servo information on a disk in a hard disk drive, comprising:

providing a disk having at least first and second tracks, each of said first and second tracks having at least one servo sector, and a first half track portion and a second half track portion, said first half track portion adjacent to said second half portion;

erasing a first location of one of said first and second half track portions of one of said first and second tracks using a first predetermined field;

erasing a second location of one of said first and second half track portions of one of said first and second tracks using a second predetermined field, said second predetermined field having a different polarity than said first predetermined field, said first location adjacent to said second location.

38. The method of claim 37, further comprising:

writing servo information on a third location of the first half track of said first track of said at least one servo sector.

39. The method of claim 37, wherein the polarity of said first predetermined field is opposite to the polarity of said second predetermined field.

40. The method of claim 37, wherein, the first location is on the second half track portion of said first track; and the second location is on the first half track portion of said second track.

* * * * *